March 25, 1941.   A. MARTINICH ET AL   2,235,940
TRUCK
Filed June 7, 1940   3 Sheets-Sheet 1

Inventors
Anthony Martinich
John Jurkas
By Clarence A. O'Brien
Attorney

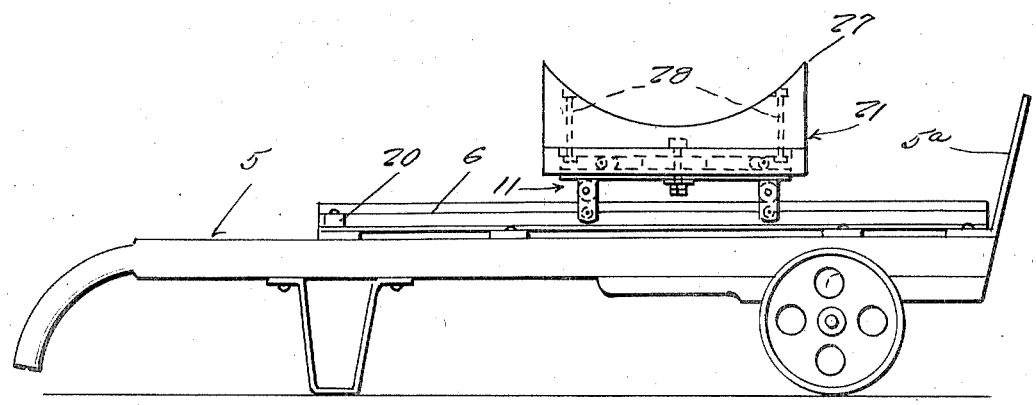
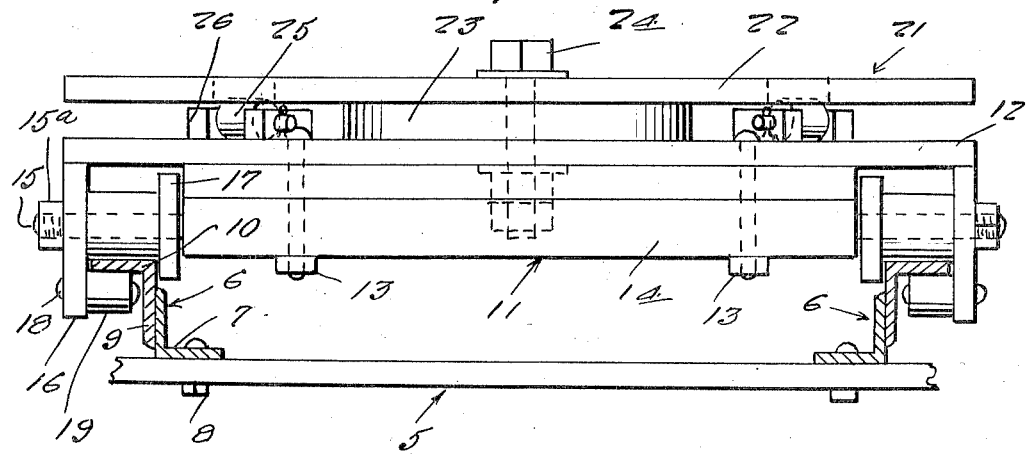
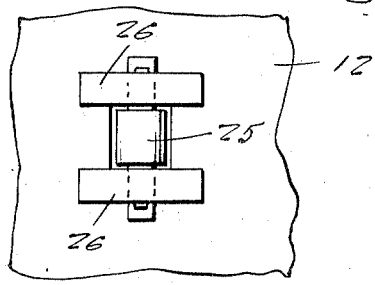
Inventors
Anthony Martinich
John Jurkas
By Clarence A. O'Brien
Attorney March 25, 1941.  A. MARTINICH ET AL  2,235,940
TRUCK
Filed June 7, 1940  3 Sheets-Sheet 3
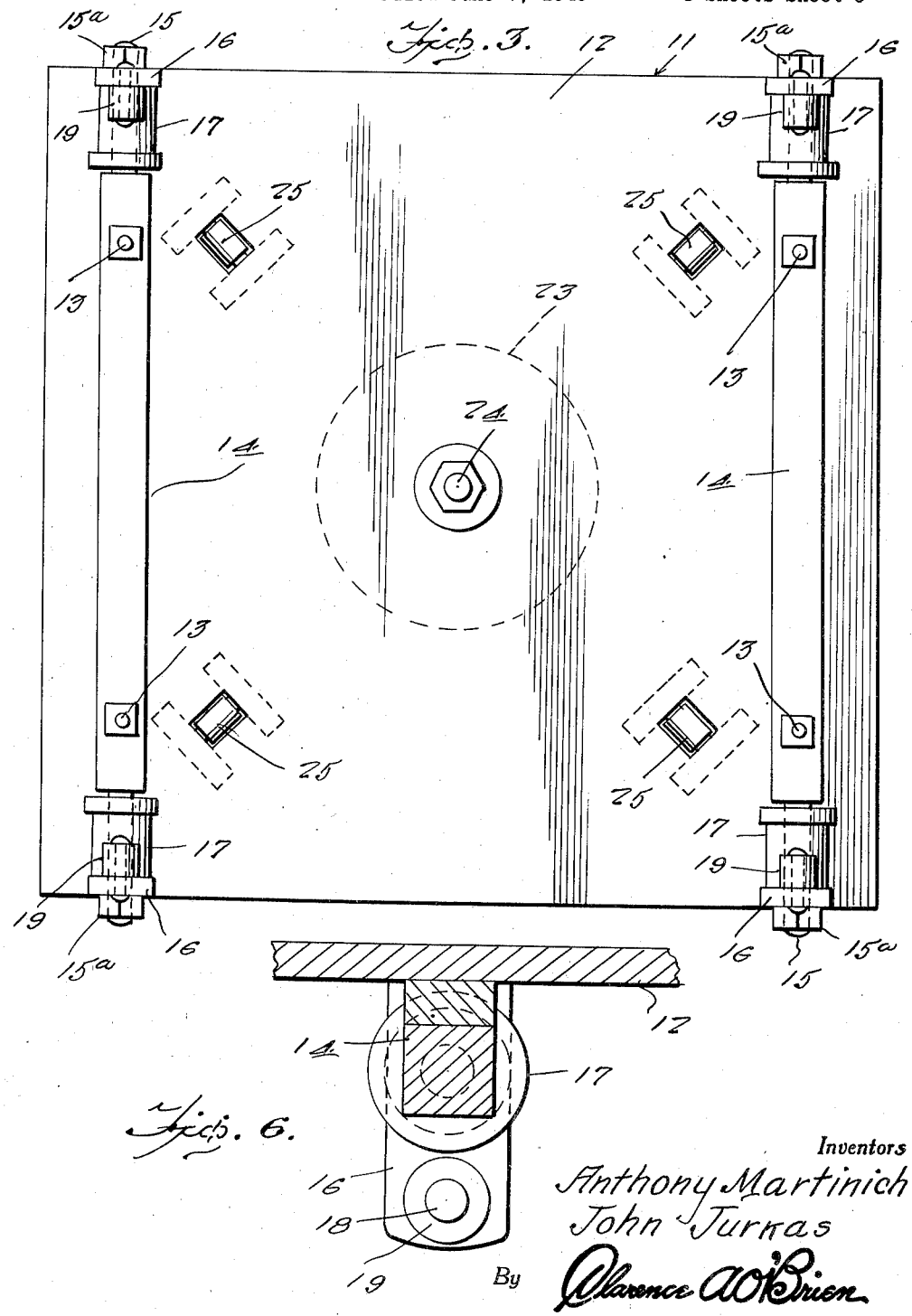

Patented Mar. 25, 1941

2,235,940

UNITED STATES PATENT OFFICE 2,235,940

TRUCK

Anthony Martinich and John Jurkas,
Stamford, Conn.

Application June 7, 1940, Serial No. 339,378

1 Claim. (Cl. 280—56)

This invention relates to trucks of the kind used for warehouses and other places for the moving of heavy articles by manual labor, and particularly the invention has reference to a truck of this character equipped with a mobile carriage thereon, and the carriage in turn having a turntable mounted thereon to the end that such heavy article may be more easily handled and swung in a direction to facilitate the transfer of the article thereon to the place desired as, for example, onto a motor truck or the like; and the invention, together with its objects and advantages will be best understood from a study of the following description taken in connection with the accompanying drawings wherein:

Figure 2 is a side elevational view of the truck.

Figure 3 is a bottom plan view of a carriage forming part of the invention.

Figure 4 is a sectional view taken through the hand truck and showing a carriage and turntable structure mounted thereon in accordance with the teachings of this invention.

Figure 6 is a detail sectional view showing a roller assembly at a corner of the truck, and Figure 7 is a fragmentary plan view of the body or platform of the truck with an anti-friction roller shown mounted thereon.

Figures 1, 5:
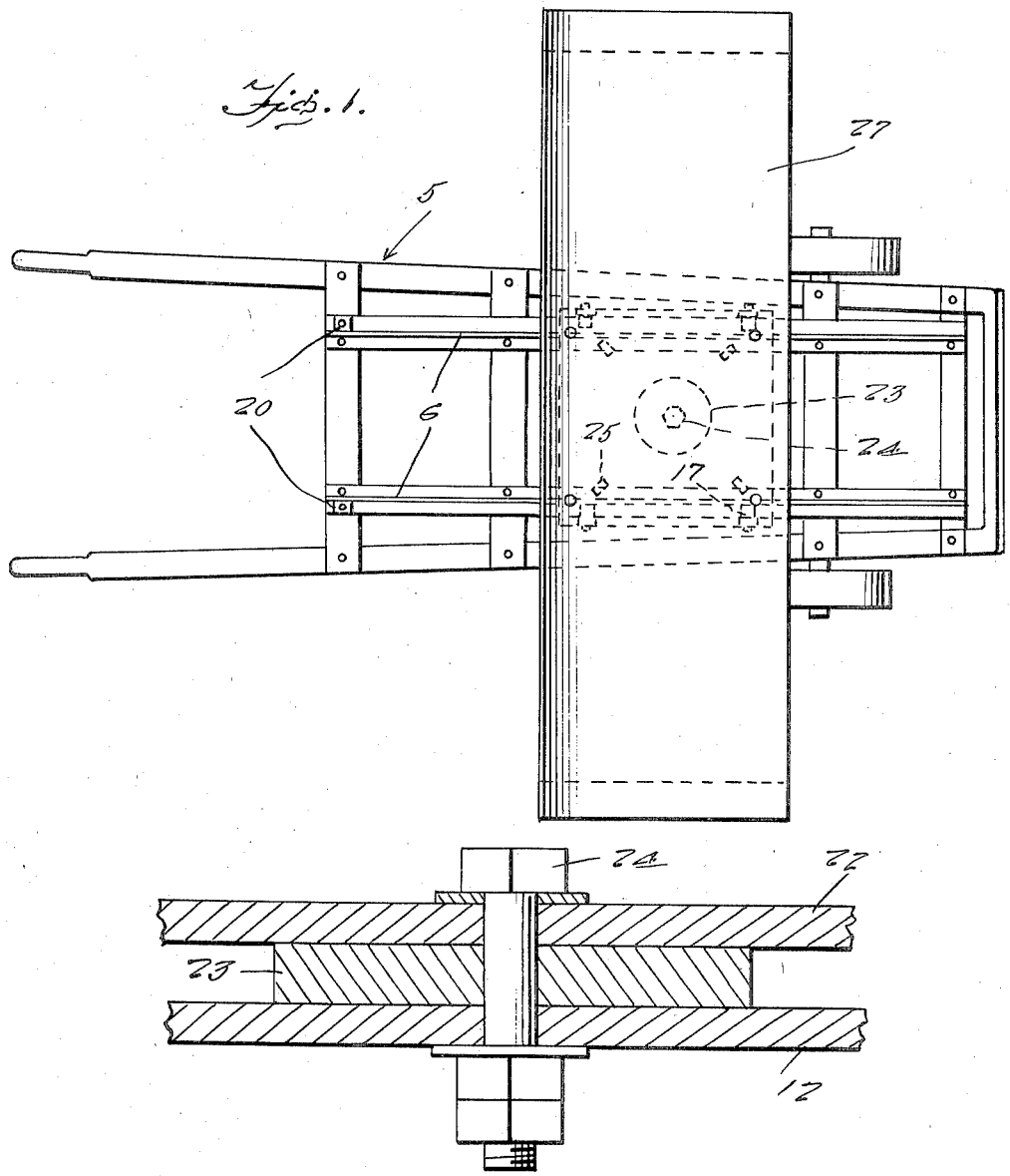
Figure 1 is a top plan view of a hand truck equipped in accordance with the present invention.
Figure 5 is a sectional view through the carriage and turntable at the point where the table is rotatably secured to the main body or platform of the truck.

Referring more in detail to the drawings it will be seen that 5 indicates generally a more or less conventional hand truck such as used in warehouses and the like for the handling of large and heavy articles.

Since the particular form of truck 5 is not of the essence of the invention, only such parts thereof will be specifically referred to as believed necessary for an understanding of this invention.

In accordance with the present invention there are mounted on the frame of the truck 5 so as to extend longitudinally thereof a pair of parallel rails 6, and as best shown in Figure 4 each rail 6 consists of a pair of angle irons, one of which, 7, has a flange bolted or otherwise secured to the cross-members of the truck as at 8, while the other flange thereof is spot welded or otherwise positively united with and secured to a flange of the second angle iron, 9, the second flange of the second angle iron 9, and indicated by the reference numeral 10, forming the ball or tread surface of the rail.

Further in accordance with the present invention there is provided a carriage indicated generally by the reference numeral 11.

In the present instance the carriage 11 comprises a body or platform 12 that is substantially rectangular and has bolted or otherwise secured to the underside thereof adjacent opposite edges of the platform and body, as at 13, axle seats 14 that accommodate fixed axles 15; the axles 15 being secured to the seats 14 through the medium of the aforementioned bolts 13.

The ends of the respective axles 15 extend through openings provided therefor in hanger brackets 16 depending from the body or platform 12 of the truck, and on said ends of the axles are threaded nuts 15a as shown.

Also on the respective opposite ends of each axle 15 are flanged rollers 17 that ride on the rails 6 as shown in Figure 4.

Suitably mounted on stub shafts 18 extending inwardly from the lower ends of the hangers 16 are retaining rollers 19 that engage the underside of the rail treads or heads as likewise shown in Figure 4. Thus it will be seen that the carriage is retained on the rails to move longitudinally thereof in either direction and against displacement.

Also the usual retaining lip 5a of the truck will act as a stop for the carriage moving in one direction, while at the ends of the rails 6 remote from the lip 5a there are provided stop blocks 20 for limiting movement of the carriage towards the last-named ends of the rails.

Also in accordance with the present invention there is mounted on the carriage 11 a turntable 21.

The turntable 21 embodies a body or platform member 22 that at its center rests on a spacer disk 23 suitably provided on the center of the platform 12 of the carriage, and the body 22 of the turntable revolves about a bolt 24 as an axis.

The bolt 24, as clearly shown, serves to secure the turntable to the truck.

Also, the under-surface of the body 22 of the turntable is in contact with anti-friction rollers 25 suitably mounted on the body 12 of the truck, there being provided a pair of bearings 26 for each roller.

Completing the structure of the turntable is an elongated cradle 27 bolted or otherwise secured to the body 22 of the turntable as at 28. Preferably the cradle 27 in the top thereof is provided with a longitudinally extending groove, curved in end elevation as shown in Figure 2 so as to permit a roll of leather cloth or other roll material to seat conformably thereon.

It will thus be seen that the cradle 27 may be disposed either longitudinally of the truck 5 or, as shown, transversely thereof, as may be found desirable.

It will also be seen that in using this truck the carriage 11 may be shifted towards either end of the truck and the turntable revolved on the carriage to the position desired thus facilitating to a material extent the handling, with this truck, of such heavy articles such as rolls of leather cloth and the like.

It is also to be understood that while it is contemplated that the invention be used in full size for every-day purposes, that it can also be made in miniature for use as a toy.

It is thought that a clear understanding of the construction, manner of use, utility and advantages of a truck embodying the features of the present invention will be had without a more detailed description thereof.

It is also to be understood that while I have herein shown and described a preferred embodiment of the invention, it is in no wise intended to restrict the invention to the precise details of construction, combination and arrangement of elements as herein illustrated other than as may be required by the prior art and scope of the claim hereunto appended.

Having thus described the invention what is claimed as new is:

In a device of the class described, a hand truck, a pair of longitudinally extending rails connected with the body thereof and each including an outwardly extending flange, a carriage, bolsters extending across the under side of the carriage, axles extending from the ends of the bolsters, wheels on the axles for engaging the flanges of the rails and each wheel having a flange at its inner end for engaging a vertical part of the rail, hangers extending from the side edges of the carriage and having holes therein through which the axles pass, means at the outer ends of the axles and engaging the outer faces of the hangers for holding the parts together, and a small roller carried by the lower end of each hanger for engaging the under side of a flange of a rail.

ANTHONY MARTINICH.
JOHN JURKAS.